Nov. 27, 1934.　　　　G. A. TINNERMAN　　　　1,981,973
FASTENING DEVICE
Original Filed Nov. 23, 1932
FIG. 1
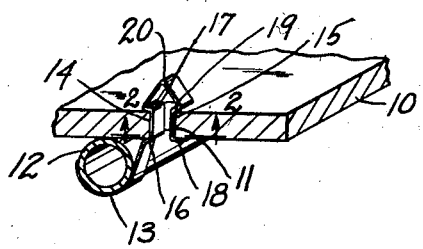
FIG. 2
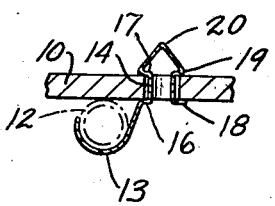
FIG. 3
FIG. 4
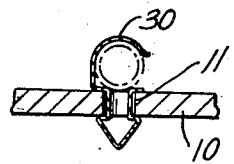
FIG. 5
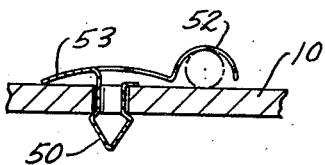
FIG. 6
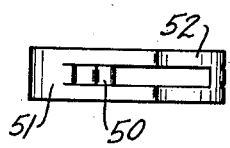
FIG. 7
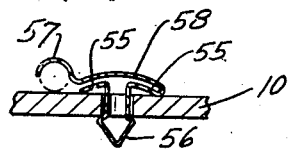
FIG. 8
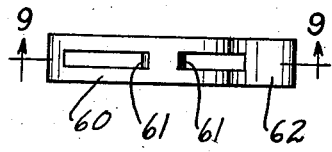
FIG. 9
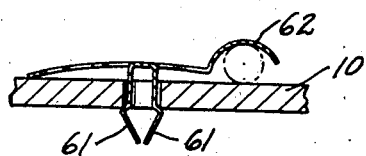
Inventor
George A. Tinnerman
By Bates Gobrick & Teare
Attorneys Patented Nov. 27, 1934

1,981,973

UNITED STATES PATENT OFFICE 1,981,973

FASTENING DEVICE

George A. Tinnerman, Rocky River, Ohio, assignor to Albert H. Tinnerman, Cleveland, Ohio Original application November 23, 1932, Serial No. 643,981. Divided and this application March 20, 1933, Serial No. 661,766

1 Claim. (Cl. 24—73)

This invention relates to fastening devices and particularly to a spring clip which may be used for holding conduits, electrical conductors and the like in place upon a support. Heretofore, fastening devices for this purpose have necessitated the use of bolts and nuts and in addition, a metallic clip which extended over the conduit and which was locked to the panel by the bolt. The present application is a division of my copending application, Serial No. 643,981 filed Nov. 23, 1932.

This procedure has entailed considerable expense, not only in the cost of material but also in the cost of labor. Furthermore, the nuts are easily loosened particularly where the article is subjected to considerable vibration, such as on motor vehicle.

An object of the present invention therefore, is to provide a fastening device, which will hold any article such as a conduit or conductor or rod in place against a panel without necessitating the use of threaded fastening members and the like.

A further object of my invention is to make a fastener, which can be readily snapped into place and when so positioned will remain locked in place by a spring tension, notwithstanding the extent to which the article may be vibrated.

Referring now to the drawing, I have shown a number of different forms in which a fastener embodying my invention may be made. For example, Fig. 1 is a perspective view of one form of fastener, and Fig. 2 is a section taken on the line 2—2 in Fig. 1; Fig. 3 is a vertical section taken through the fastener shown in Fig. 1; Fig. 4 is a vertical section taken through a modified form of fastener; Fig. 5 is a vertical section taken through another modified form; Fig. 6 is a top plan view of the fastener shown in Fig. 5; Fig. 7 is a vertical section taken through a fastening device embodying another modification of the invention; Fig. 8 is a top plan view of a fastener embodying still another modification, while Fig. 9 is a section taken on the line 9—9 in Fig. 8.

A fastener embodying my invention may be made from a strip of round or flat wire which is suitably bent to provide an article holding portion and an integral panel engaging portion. The fastener may assume various shapes and forms in accordance with the use for which it is intended, so I have shown a variety of such forms as illustrative of the invention.

Referring now to Fig. 1, the panel or support is indicated at 10 as having an opening 11 adjacent the conduit 12 which is to be held against the face of the panel. The fastener has a portion thereof bent, as at 13, to extend partially around the conduit and has another portion bent to project through the opening in one direction, and thence reversely back through the opening. The panel engaging portion thus has an arm 14 and an arm 15 which are normally urged away from each other by the spring tension of the metal of which the fastener is made. To obtain a locking action against the panel, I have shown the arm 14 as having shoulders 16 and 17 which engage the opposite faces of the panel, and I have shown the arm 15, as having shoulders 18 and 19 for likewise engaging opposite faces of the panel.

The connecting portion 20 of the arms is shown as being V-shaped on this particular figure, but if desired, it may be U-shaped or any other suitable form. In any event the distance between the outermost edges of the shoulders 17 and 19 is such that the fastener may be pressed through the opening with one hand, while the other is pressed to hold the conduit in place until part 13 is forced into engagement therewith. During the assembly operation, the arm 15 is pressed against the arm 14 automatically by the passage of the fastener through the opening so that the entire assembly may be completed by means of a single motion.

Referring now to the modification, which I have illustrated in the drawing, Fig. 4 shows a fastener that has a panel engaging portion similar to that shown in Fig. 1, but has an article engaging portion 30 which extends in the opposite direction to that illustrated in Fig. 1. Thus, the conduit conceals the openings through which the fastener extends.

A modification illustrated in Figs. 5 and 6 comprises a fastener, which is made from a strip of flat ribbon wire and which has the panel engaging portion 50 struck downwardly from the body portion 51. Such body portion is bent to provide an article engaging port 52 and to an arched port 53 that bears against the base of the panel.

The modification of Fig. 7 may comprise a single strip of round or flat wire which has two shoulder portions 55 for engaging the face of the panel and which has a panel interlocking portion 56 that extends through the panel opening. One shoulder portion is bent backwardly upon itself as at 58 to provide an upper arch, and is then bent at the free end thereof to provide an article engaging port 57.

The form of fastener shown in Figs. 8 and 9 comprises a flat strip 60 which has a panel engaging portion 61 struck from the body portion thereof. The body portion is arched to bear at one end against the panel and is bent at the other end to form an article engaging port 62.

In view of the foregoing description, it will be apparent that although I have illustrated a number of modifications, each fastener comprises an integral unit, which simultaneously contacts an article and locks it against a panel or other support. It is also apparent that this locking action may be accomplished by means of a single assembly movement, and that the member, when once locked in place will be securely held.

I claim:—

A snap fastener having an arched body portion and adapted to extend above a support, the body portion having a curved part, adjacent the end thereof for engaging an article, the body portion having a strip struck downwardly therefrom and intermediate the ends thereof, the strip having a reverse bend therein so as to provide a leg which depends from the body portion, and the leg having two shoulders thereon for locking the fastener against a support.

GEORGE A. TINNERMAN.